United States Patent [19]
Winkin

[11] 3,877,440
[45] Apr. 15, 1975

[54] CURTAIN AIR SYSTEM FOR VAPOR GENERATORS

[75] Inventor: Justin P. Winkin, Fairlawn, N.J.

[73] Assignee: Foster Wheeler Corporation, Livingston, N.J.

[22] Filed: Jan. 18, 1974

[21] Appl. No.: 434,737

[52] U.S. Cl. .......... 122/235 B; 110/72 R; 110/75 R
[51] Int. Cl. ............................................. F22b 21/00
[58] Field of Search .................. 122/235 R, 235 B; 110/72 R, 75 R, 28 R, 28 S, 28 Q

[56] References Cited
UNITED STATES PATENTS

| | | |
|---|---|---|
| 1,617,694 | 2/1927 | Schwartz ........................... 110/28 S |
| 2,294,242 | 8/1942 | Rohrer ............................... 110/28 R |
| 2,695,599 | 11/1954 | Armacost ........................... 110/28 R |
| 3,048,131 | 8/1962 | Hardgrove ........................ 110/72 X |
| 3,662,719 | 5/1972 | Winkin ............................. 122/235 R |

Primary Examiner—Kenneth W. Sprague
Attorney, Agent, or Firm—Marvin A. Naigur; John E. Wilson; Warren B. Kice

[57] ABSTRACT

A furnace assembly and method in which at least one burner is associated with one or more walls of a furnace enclosure with auxiliary supplies of air being introduced into the enclosure from the bottom thereof and through openings formed in each of the walls.

12 Claims, 3 Drawing Figures

PATENTED APR 15 1975　3,877,440

3,877,440

CURTAIN AIR SYSTEM FOR VAPOR GENERATORS

BACKGROUND OF THE INVENTION

This invention relates to a furnace assembly and method and, more particularly, to an improved furnace assembly and method in which the formation of slag deposits and nitric oxides as a result of fuel combustion is reduced.

A great deal of attention has recently been directed to the reduction of slag deposits on the heat absorption surfaces of the interior walls of a furnace assembly during the combustion of fuel at the furnace, and especially in connection with the furnace sections of relatively large installations, such as vapor generators and the like. The slag deposits, of cource, severely curtail the efficiency of the unit and result in an imbalance of heat absorption throughout the furnace section.

A related problem arises from the fact that one or more burners are usually disposed in communication with the interior of the furnace and operate to combust coal in air. Since nitrogen is present in the air and, in most cases, in the fuel, a relatively high level of one or more oxides of nitrogen is produced which causes severe air pollution problems.

SUMMARY OF THE INVENTION

It is therefore an object of the present invention to provide a furnace assembly and method in which the build-up of slag deposits along the heat absorption surface of the furnace is reduced.

It is a further object of the present invention to provide a furnace assembly and method in which the level of nitric oxides is reduced.

It is a more specific object of the present invention to provide a furnace assembly and method in which air is introduced through the bottom of the furnace and through openings formed in the walls thereof to maintain an oxidizing atmosphere along the interior wall surfaces and to locally lower the temperature in certain zones of the furnace interior, which reduces the formation of slag deposits and nitric oxides.

Toward the fulfillment of these and other objects, the furnace assembly of the present invention comprises four vertically extending walls interconnected to form an enclosure, at least one burner associated with at least one of said walls and adapted to discharge into said enclosure, first means for introducing air into the lower end of said enclosure, second means for introducing air through openings in the wall associated with said burner, and third means for introducing air through openings formed through at least one wall connected to said wall associated with said burner, whereby said air rises in said enclosure adjacent the interior surfaces of said walls.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiments in accordance with the present invention, when taken in connection with the accompanying drawings wherein.

DESCRIPTION OF THE PREFERRED EMBODIMENTS

Figure 3:
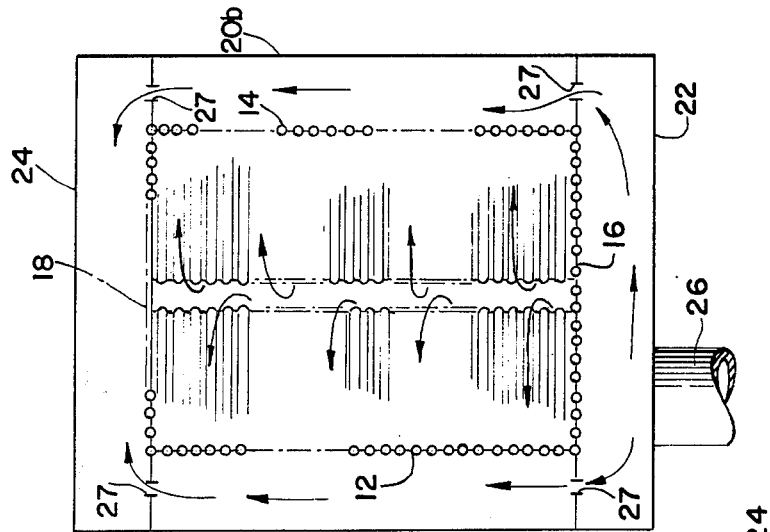
FIGS. 2 and 3 are sectional views taken along the lines 2—2 and 3—3, respectively, of FIG. 1.
Figure 2:
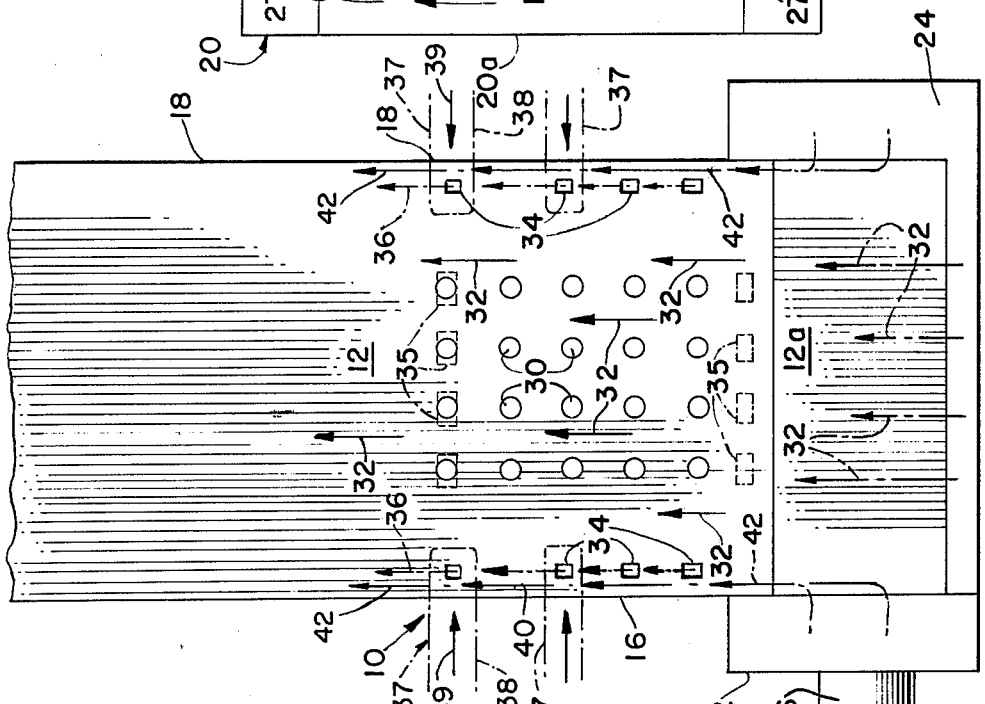
Figure 1:
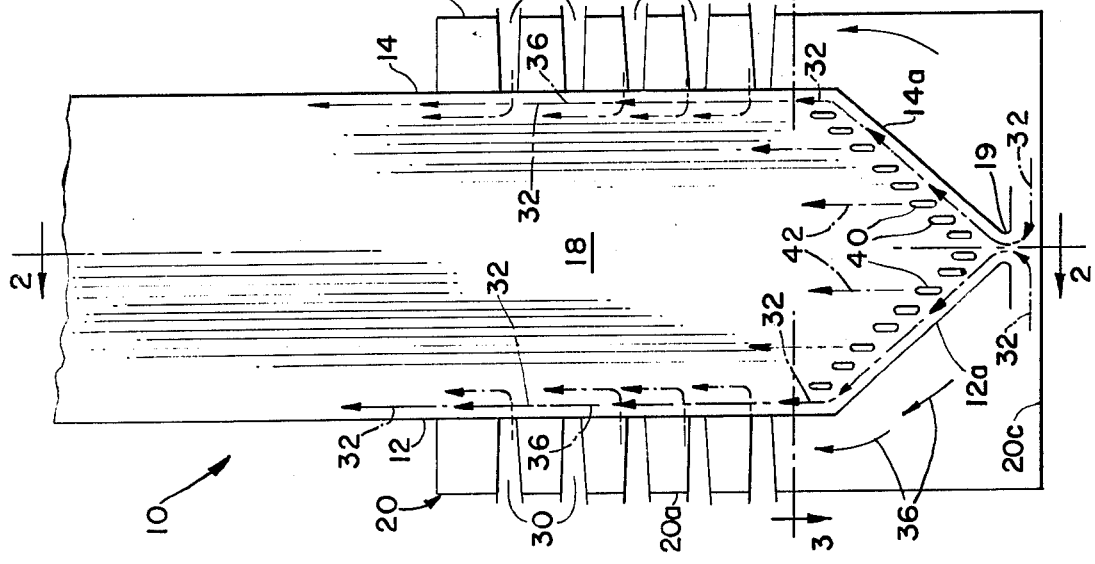
FIG. 1 is a schematic sectional view of a furnace section of a vapor generator incorporating features of the present invention.

Referring specifically to FIGS. 1–3 of the drawings, the reference numeral 10 refers in general to a furnace section forming a portion of a vapor generator and consisting of a front wall 12, a rear wall 14, and a pair of side walls 16 and 18, all interconnected to form a vertically extending enclosure. For the convenience of presentation, the upper portions of these walls, as well as the remaining portion of the vapor generator, are not shown since the features of the invention are related to the lower portion of the furnace section shown.

As shown in FIG. 1, the front and rear walls 12 and 14 have sloped bottom end portions 12a and 14a respectively which converge to form a hopper portion having a bottom end opening 19.

As best shown in FIG. 3, each of the walls 12, 14, 16, and 18 are formed by a plurality of spaced parallel tubes which are connected by fins, or membranes, to form a continuous airtight structure. The lower ends of the tubes forming the walls 12, 14, 16, and 18 are connected to an external source of water via headers, or the like (not shown), and the water is converted to steam during its passage through the tubes, after which it is collected for further use in a conventional manner. Although not shown in the drawings, an outer insulating wall would normally be provided immediately adjacent each of the walls 12, 14, 16, and 18.

A windbox 20, of a conventional design and material, encloses the lower portion of the furnace section 10 and includes a pair of side walls 20a and 20b that are parallel to and spaced from the front and rear walls 12 and 14, respectively. The windbox 20 also includes a floor portion 20c that extends below the bottom end opening 19 of the furnace section 10. While the flow from the windbox 20 can usually supply sufficient air required in accordance with the present invention, in some cases it may be necessary or advantageous to utilize a separate fan to provide sufficient additional air flow, and this aspect of the present invention will hereinafter be described in greater detail.

A pair of outer air enclosures 22 and 24 are connected to the walls 16 and 18, respectively, with the air enclosure 22 receiving air from an external source via a conduit 26. As shown in FIG. 3, four openings 27 are provided in the common walls between the windbox 20 and the air enclosures 22 and 24 to distribute the air from the air enclosure 22 into the windbox 20 and, from the latter, into the air enclosure 24, for reasons that will be described in detail later.

A plurality of burners 30 are supported by the walls 20a and 20b and are aligned with openings formed in the walls 12 and 14 for discharging an air/fuel mixture through the latter openings into the interior of the furnace section 10. As shown in FIG. 2, the burners 30 are arranged in four vertical rows of five burners per row, it being understood that the number of burners and their pattern can vary in accordance with particular design requirements.

As will be noted from FIGS. 1 and 2, typically the windbox 20 extends to a height slightly above the upper level of burners 30 while the air enclosures 22 and 24 extend to a height slightly above the upper ends of the sloped portions 12a and 14a of the walls 12 and 14.

In operation, air is introduced into the air enclosure 22 via the conduit 26 and a portion thereof passes into the windbox 20, and then underneath and into the furnace section 10 via the bottom end opening 19, before passing upwardly adjacent the walls 12 and 14, as shown by the flow arrows 32.

As better viewed in FIG. 2, at least two vertical rows of openings 34 are provided in each of the walls 12 and 14 to either side of the openings for the burners 30, and also, at least two rows of openings 34 may be provided in the side walls 16 and 18 which have not been shown in the drawings. Additional openings 35, as shown by the broken line representation in FIG. 2, may also be provided between the openings 34. As a result, a portion of the air from the windbox 20 passes into the furnace section 10 via the openings 34, 35 and flows adjacent the walls 12 and 14 in the direction indicated by the flow arrows 36.

The additional air that may be required is supplied by a combined fan and conduit system 37 which is schematically shown by the broken line representation of FIG. 2. The combined system 37 includes a conduit 38 and directional arrows 39 which is the schematic representation for the fan and air flow.

As better shown in FIG. 1, a plurality of slots 40 are formed through the walls 16 and 18 which are aligned parallel with the slanted portions 12a and 14a of the walls 12 and 14, respectively. As a result, a portion of the air from the air enclosures 22 and 24 passes into the furnace section 10 through the slots 40 and flows upwardly adjacent the walls 16 and 18, as shown by the flow arrows 42.

It is understood that the various streams of air discussed above, plus the gaseous products of combustion pass upwardly in the furnace section 10 by convection and then are directed to other sections of the vapor generator such as a horizontal gas pass and a convection section, where they ultimately pass to a stack, or the like, in a conventional manner.

The relatively cool air flowing into and through the interior of the furnace section 10 in the above manner reduces the temperature in the combustion zones in the interior of the furnace 10 adjacent the burners 30 which, in turn, lowers the temperature of the gas and ash particles in the interior so that the ash particles will have a reduced tendency to adhere to and build up on the interior surfaces of the walls 12, 14, 16, and 18. Also, the flowing air maintains an oxidizing atmosphere in the areas adjacent to or in contact with the interior surfaces of the walls 12, 14, 16, and 18. Since the fusion temperature of ash particles is higher in an oxidizing atmosphere than in a reducing atmosphere, the tendency for slag formations to form on these surfaces is further reduced. (It should be noted that the presence of the oxidizing atmosphere adjacent to or in contact with the interior surfaces of the walls also reduces the possibility of corrosion which might take place in a reducing atmosphere.) In addition to reducing the slag formations and the possibility of corrosion, the reduced temperature in the furnace interior reduces the formation of oxides of nitrogen.

It is understood that in accordance with the present invention, the percentage of air in the air-fuel mixture directly introduced into the burners 30 can be reduced to a value less than the full value required for normal operation, with the balance being supplied by the above described air flow through the furnace interior. This delay of the full combustion further aids in the reduction of nitric oxides.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A furnace assembly comprising at least four vertically extending walls interconnected to form an enclosure, each of two opposite facing walls having a lower sloped end portion to form a hopper section terminating in an inlet, at least one burner associated with at least one of said opposite facing walls and adapted to combust an air-fuel mixture in said enclosure, first means for introducing air through said inlet and into the lower end of said enclosure, a plurality of openings formed through at least one wall connected to said wall associated with said burner, said openings being aligned in a plane parallel to the sloped end portion of said latter wall, and second means to introduce air through said openings, whereby said air rises in said enclosure adjacent the interior surfaces of said walls.

2. The furnace assembly of claim 1 wherein a plurality of openings are formed through two walls connected to said wall associated with said burners.

3. The furnace assembly of claim 1 wherein a plurality of openings are formed through said wall associated with said burner and further comprising third means for introducing air through said latter openings.

4. The furnace assembly of claim 3 wherein a plurality of burners are associated with each of said opposite facing walls, and a plurality of openings are formed through each of said opposite facing walls, said third means introducing air through all of said latter openings.

5. The furnace assembly of claim 1 wherein said walls are formed by a plurality of interconnected finned tubes, and further comprising means for passing water through said tubes to convert it to steam.

6. The furnace assembly of claim 1 wherein the air portion of said air-fuel mixture is less than that normally required to achieve complete combustion and wherein said means supplies an amount of additional air sufficient to achieve complete combustion.

7. A method of burning a fuel-air mixture in a furnace to produce a minimum amount of slag deposits on the interior wall surfaces of said furnace, a minimum amount of corrosion and a minimum amount of nitrogen oxides in the combustion gases leaving the furnace, comprising the steps of defining a hopper portion at the bottom end of said furnace by sloped portions of two opposite facing walls, introducing an air-fuel mixture into said furnace through at least one of said opposite facing walls for combusting in said furnace, forming openings through at least one wall of said furnace connected to said one opposite facing wall and introducing air through said hopper portion and through said openings to lower the temperature in said furnace and maintain an oxidizing atmosphere along the interior surfaces of said walls.

8. The method of claim 7 wherein said openings are formed through two walls connected to said one opposite facing wall.

9. The method of claim 7 wherein said air-fuel mixture is introduced into said furnace through both of said opposite facing walls.

10. The method of claim 9 further comprising the step of forming a plurality of openings through said opposite facing walls and introducing air through said latter openings.

11. The method of claim 7 further comprising the step of regulating the amount of air supplied through said burner opening to an amount which is less than the normal operating condition of approximately 120% theoretical combustion air requirements for the corresponding fuel to delay the complete combustion of said fuel and thereby reduce the maximum flame temperature in the furnace and the formation of nitrogen oxides below the values which would occur if all of the air generally required for complete combustion were introduced with the fuel, said air introduced through said hopper portion and said openings serving as a source for the remaining air required to achieve complete combustion.

12. The method of claim 7 further comprising the step of passing water through said walls to convert it to steam.

* * * * *